P. LÜPKE, Jr.
PIPE HANGER.
APPLICATION FILED SEPT. 30, 1916.
1,224,309. Patented May 1, 1917.
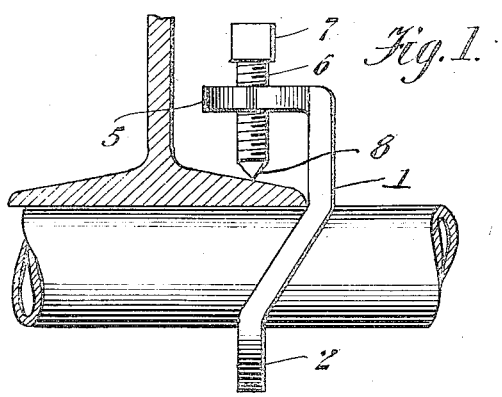
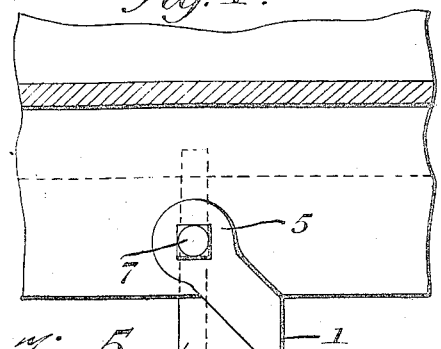
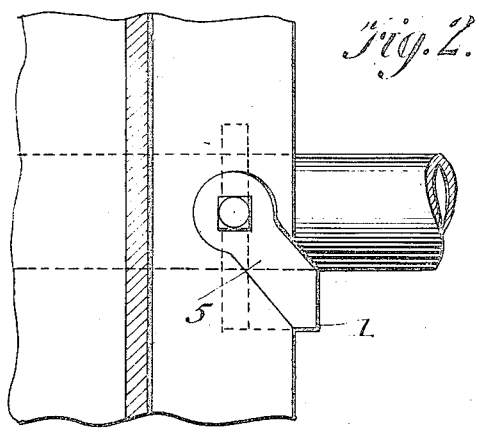
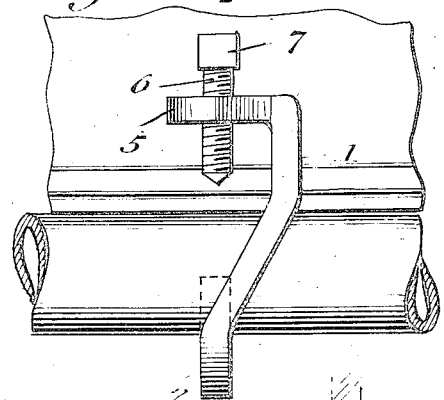
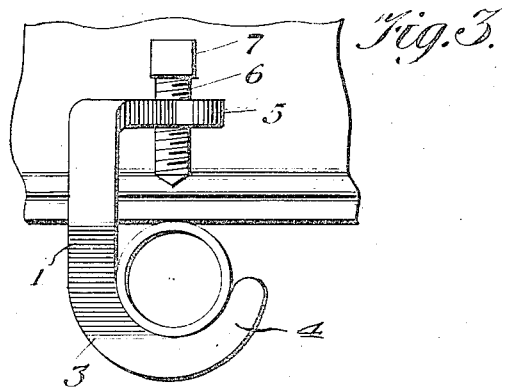
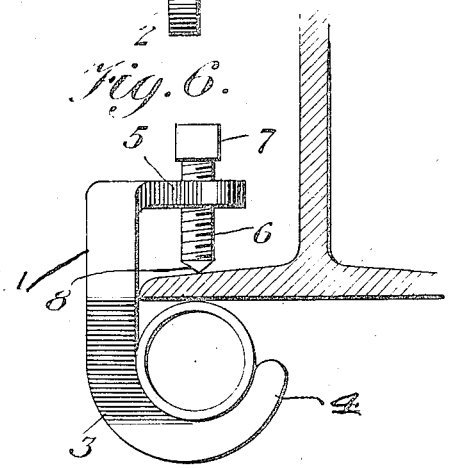
Inventor
Paul Lüpke Jr.
By William R. Baird
his attorneys

UNITED STATES PATENT OFFICE.

PAUL LÜPKE, JR., OF TRENTON, NEW JERSEY.

PIPE-HANGER.

1,224,309.   Specification of Letters Patent.   Patented May 1, 1917.

Application filed September 30, 1916. Serial No. 122,958.

*To all whom it may concern:*

Be it known that I, PAUL LÜPKE, Jr., a citizen of the United States, residing at Trenton, in the county of Mercer and State of New Jersey, have invented certain new and useful Improvements in Pipe-Hangers, of which the following is a specification.

This invention relates to pipe hangers and more particularly to that class of hangers that are used in building constructions for holding electric conduits or similar small pipe lines in position. The invention need not be limited particularly to small pipes as it will readily be appreciated that the hanger could easily be made of heavier material and increased in size for pipes of any diameter. I merely use it in its present form as an illustration of the application of my idea.

The principal object of this invention is to provide a hanger which may be used regardless of the direction in which the pipe runs, thereby obviating the necessity of having a multiplicity of hangers of right, left and intermediate formation. Hangers of this latter type only accommodate pipes running in a certain direction.

Another object of the device is the provision of a hanger in which the pipe is securely held in place upon one side of the beam by a turn screw on the opposite side of the beam which positively holds both pipe and hanger in position.

Still another object is the provision of a pipe hanger which is so constructed that the same is of a slightly springy nature which obviates to a certain extent the tendency of the parts becoming loosened through vibrations.

Another object of the invention is the provision of a hanger in which there are but two bearing points one on the pipe the other on the beam or support.

These and other objects will clearly present themselves to those skilled in the art after reading the following specification in connection with the accompanying drawings and particularly pointed out in the appended claims.

In the drawings Figure 1 is a side elevation of the hanger as it would be applied to the beam in cases where the pipe runs in a transverse direction. Fig. 2 is a top plan showing portions of the hanger in dotted lines as to more clearly set forth the overlapping feature of the arm. Fig. 3 is an end view looking in the direction in which the pipe runs. Fig. 4 is a top plan view of the device as applied in cases where the pipe runs parallel with the beam and Figs. 5 and 6 are side and end views respectively of the hanger as applied in Fig. 4.

The general formation of the clamp as will be noted in Figs. 3 and 6 is U-shaped and to more clearly set forth the invention I will refer to the two horizontal portions as arms or head and foot portions and the intervening connection as the body portion.

The reference character 1 designates the body portion the lower half of which is bent out of alinement with the upper half as shown at 2. The foot portion 3 extends in a right angular direction from the lower end of part 2 and is preferably hook shaped as at 4 to partly encircle the pipe and thereby afford a good seat for the same. The head portion as designated at 5 extends from the upper end of the upper half of the body portion in such a direction that the extreme end of this head section overlaps the medial point of the hook shaped foot portion. The head section is perforated in alinement with the medial point of the foot section and a turn screw 6 which if preferred may be provided with a squared portion 7 for the reception of a wrench. The turn screw may if desired be provided with a sharpened point 8 so as to enable the screw to secure a firm hold upon the beam and prevent the clamp from slipping off.

The clamp is preferably made from steel stampings and it will be noted particularly in Figs. 1 and 4 that the body portion is longer in linear length than the direct distance between the head and foot portions. This construction allows or gives to the clamp a certain amount of resiliency so that when the said clamp is applied and fastened in position the arms are slightly sprung apart thereby holding the clamp in its secured position under a tension which prevents loosening of the parts through vibration.

The application of the device is clearly obvious to any one skilled in the art and I wish it understood that certain changes or variations as to detailed constructions of the clamp may be resorted to without sacrificing or limiting the scope of my invention.

I claim:

1. In a pipe hanger comprising a body portion, arms arranged at each end thereof and extending in relatively different lateral directions one arm crossing the opposite arm, and means for securing the hanger in position.

2. In a pipe hanger comprising a body portion, arms arranged at each end thereof and extending in relatively different lateral directions one arm crossing the medial point of the opposite arm and means for securing the hanger in position.

3. In a pipe hanger comprising a body portion, arms arranged at each end thereof and extending in relatively different lateral directions one arm crossing the medial point of the opposite arm and means associated with one arm for securing the hanger in position.

4. In a pipe hanger comprising a body portion, arms arranged at each end thereof and extending in relatively different lateral directions one arm crossing the medial point of the opposite arm and means associated with one arm in alinement with the medial point of said crossed arm for securing the hanger in position.

5. In a pipe hanger comprising a body portion, arms arranged at each end thereof and extending in relatively different lateral directions one arm crossing the medial point of the opposite arm and a set screw associated with one arm in alinement with the medial point of said crossed arm for securing the hanger in position.

6. A pipe hanger comprising a body portion of angular formation, arms arranged at the ends thereof and extending in such direction that one arm crosses the medial point of the other arm.

7. In a pipe hanger comprising a body portion, one end of which is bent out of alinement, arms arranged at each end of the body portion and extending in such a direction that one arm overlaps the other and means for securing the hanger in position.

8. In a pipe hanger comprising a body portion, one end of which is bent out of alinement, arms arranged at each end of the body portion and extending in such a direction that one overlaps the medial point of the opposite arm and means associated with the overlapping arm in alinement with the said medial point to secure the hanger in position.

9. In a pipe hanger comprising a body portion, a right angular extending foot portion constituting the pipe support and an obliquely extending head portion and means associated with the head portion to secure the hanger in position.

10. In a pipe hanger comprising a body portion, a right angular extending foot portion constituting the pipe support and an angular extending head portion slightly overlapping the medial point of the foot portion and means associated with the head portion and in alinement with the said medial point of the foot portion to secure the hanger in position.

11. In a sheet metal pipe hanger of the character described composed of a head, foot and body portions the linear length of the body portion being greater than the direct distance between the head and foot portions thereby affording resiliency to the said head and foot portions and means for placing the hanger under tension when in applied position.

In testimony whereof I affix my signature in presence of two witnesses.

PAUL LÜPKE, Jr.

Witnesses:
CLARENCE F. WEBER,
PAUL LÜPKE.